United States Patent
Koslow et al.

[11] Patent Number: 6,103,116
[45] Date of Patent: Aug. 15, 2000

[54] COLLAPSIBLE FILTER

[75] Inventors: Evan E. Koslow, Weston; Stephen P. Huda, Seymour, both of Conn.

[73] Assignee: KX Industries, L.P., Orange, Conn.

[21] Appl. No.: 09/164,798

[22] Filed: Oct. 1, 1998

[51] Int. Cl.[7] ................................................. B01D 24/12
[52] U.S. Cl. .................... 210/282; 210/474; 210/493.5; 210/502.1; 210/497.3; 210/503; 426/77; 426/82; 99/290; 99/295
[58] Field of Search ..................... 210/473, 474, 210/477, 493.1, 493.5, 497.01, 502.1, 497.3, 503, 282; 426/77, 82; 99/290, 295, 298

[56] References Cited

U.S. PATENT DOCUMENTS

| | | |
|---|---|---|
| 3,361,052 | 1/1968 | Weber . |
| 3,445,237 | 5/1969 | Gidge . |
| 3,811,373 | 5/1974 | Telco . |
| 4,306,492 | 12/1981 | Zimmermann ............................ 426/80 |
| 4,446,158 | 5/1984 | English et al. . |
| 4,520,716 | 6/1985 | Hayes ....................................... 99/306 |
| 4,867,993 | 9/1989 | Norskog ..................................... 426/77 |
| 5,038,675 | 8/1991 | Härtel . |
| 5,176,830 | 1/1993 | Wiggins . |
| 5,252,211 | 10/1993 | Searfoss, Jr. . |
| 5,318,703 | 6/1994 | Heiligman . |
| 5,370,041 | 12/1994 | Lowe . |
| 5,393,548 | 2/1995 | Heiligman . |
| 5,411,661 | 5/1995 | Heiligman . |
| 5,792,513 | 8/1998 | Koslow et al. ........................... 427/195 |
| 5,894,786 | 4/1999 | Miya ........................................ 210/474 |

*Primary Examiner*—Robert J. Popovics
*Attorney, Agent, or Firm*—Ohlandt, Greeley, Ruggiero & Perle, L.L.P.

[57] ABSTRACT

A collapsible fluid filter is disclosed. The filter comprises, in part, a filter medium for filtering impurities from a fluid and a lower rim sealably disposed around the filter medium. The filter further includes an upper rim and a fluid impervious collapsible wall connected between the upper and lower rims. The filter medium, the lower rim, the collapsible wall and the upper rim define a fluid containing reservoir. The collapsible wall of the filter can be collapsed between the upper and lower rims so as to minimize the volume occupied by the fluid containing reservoir and by the filter for storage purposes and can be expanded between the upper and lower rims so as to maximize the volume occupied by the fluid containing reservoir and by the filter generally during use.

13 Claims, 5 Drawing Sheets

COLLAPSIBLE FILTER

BACKGROUND OF THE INVENTION

1. Field of the Invention

The present invention relates to filters for filtering liquids, such as water. More particularly, the present invention relates to a collapsible filter that may be collapsed to reduce its volume for storage and expanded to increase its volume for use.

2. Description of the Prior Art

Filters of various configurations for filtering gasses and liquids are employed daily in households. These filters are used to remove chemical impurities as well as remove and hold particulate matter from passing along with the filtrate.

The making of a pot of coffee is one example of a household use of filters. Most coffee drinkers will generally agree that coffee tastes better when it is made with water that has been filtered to adsorb impurities, especially chemical impurities, that affect flavor. For example, heavily chlorinated water, typically found in tap water obtained from municipal water supplies, or water having a high calcium content, can detract from the flavor of coffee.

In most households, coffee is typically made in a drip type coffee maker. Such coffee makers have a pot seated on a heating element. The pot is positioned below a brew basket. The brew basket supports a fluted or pleated bowl shaped paper coffee filter element in which coffee grounds are placed. The paper coffee filter element held in the brew basket generally does not filter chemical impurities, but rather, only relatively large particulates such as the coffee grounds. Heated water is delivered into the brew basket by a water outlet connected to a water tank through a thermo siphon. The heated water drops onto and contacts the coffee grounds held by the paper coffee filter. The extracted coffee passes through the paper filter into the coffee pot below. The coffee in the pot is kept warm by the heating element.

The typical brew baskets found in most coffee makers have an inverted frustaconical shape. The paper filter element generally conforms to the inverted frustaconical shape of the brew basket. Generally, after each pot of coffee, the paper coffee filter in the brew basket must be replaced with a fresh paper filter. Typically, such paper filter elements are sold in packaging comprising nested lots of 25 to 50 filter elements.

As discussed above, such paper filter elements are not designed to remove impurities, and therefore, they do not substantially improve the taste of coffee. Rather, the principal function of such filters is to support the coffee grounds and prevent the grounds from passing into the coffee in the underlying coffee pot. Thus, another filter must be employed to remove impurities from the water before the water contacts the coffee grounds.

Accordingly, it is desirable to have a filter that is conveniently useable with a drip type coffee maker to filter impurities from the water prior to the water contacting the coffee grounds. It is also desirable to provide a filter whose volume may be minimized for storage and commercial packaging purposes but expanded to a sufficient volume to provide an adequate fluid reservoir during use of the filter. It is also desirable to provide a filter that efficiently removes impurities with a low resistance to flow so that the impurities may be filtered out of the water without increasing the time required to brew a pot of coffee. It is further desirable to provide such a filter that can be supported within the brew basket of a typical drip type coffee maker.

SUMMARY OF THE INVENTION

It is a primary object of the present invention to provide a collapsible filter that may be compacted so as to minimize the volume it occupies during storage and expanded to a sufficient volume to provide an adequate fluid reservoir during use of the filter.

In accordance with the objects of the present invention, the foregoing primary objective is realized by providing a collapsible fluid filter that comprises, in part, a filter medium for filtering impurities from water, a lower rim defining a filtration area sealably disposed around the filter medium, and an upper rim. The filter of the present invention further comprises a fluid impervious collapsible wall connected between the upper and lower rims. The lower rim, filter medium, collapsible wall and upper rim define a liquid receiving container. In the collapsed state, the height of the fluid impervious collapsible wall is minimized, which in turn, minimizes the capacity of the liquid receiving container and the overall size of the filter. The collapsible wall can be expanded between the upper and lower rims so as to maximize the height of the wall and, correspondingly, to maximize the capacity of the liquid receiving container and the overall size of the filter during use.

Other objects and advantages of the invention will be apparent from the following detailed description and the accompanying drawings.

BRIEF DESCRIPTION OF THE DRAWINGS

The drawings, not drawn to scale, include.

DETAILED DESCRIPTION OF THE PRESENT INVENTION

Figure 1:
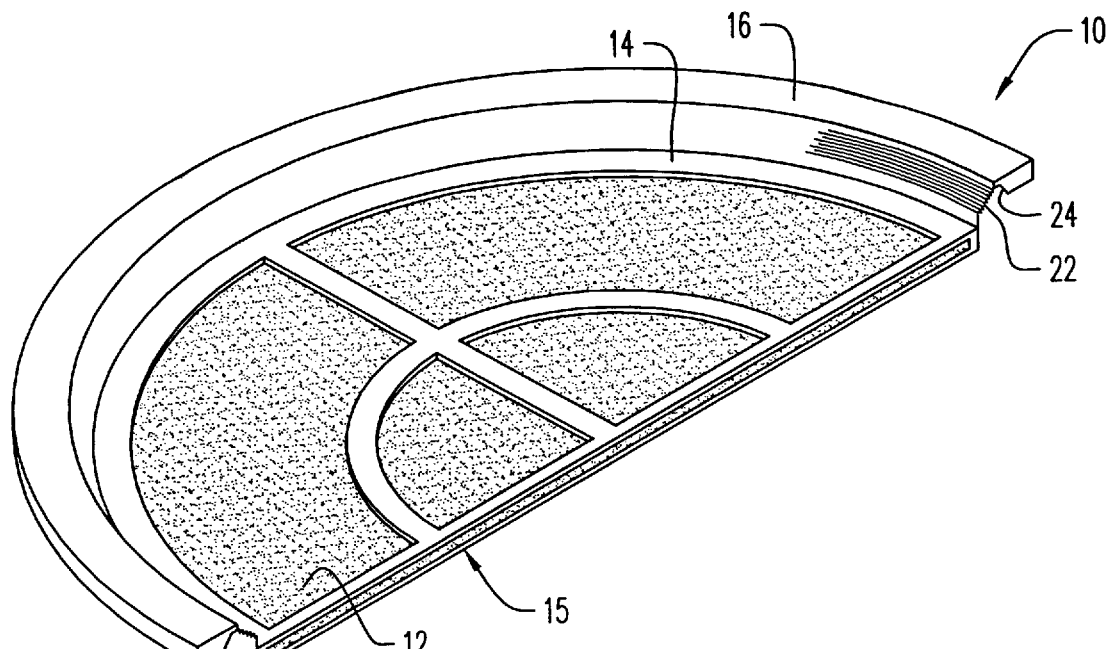
FIG. 1, which is an isometric cutaway view of the filter of the present invention in its collapsed state.
Figure 2:
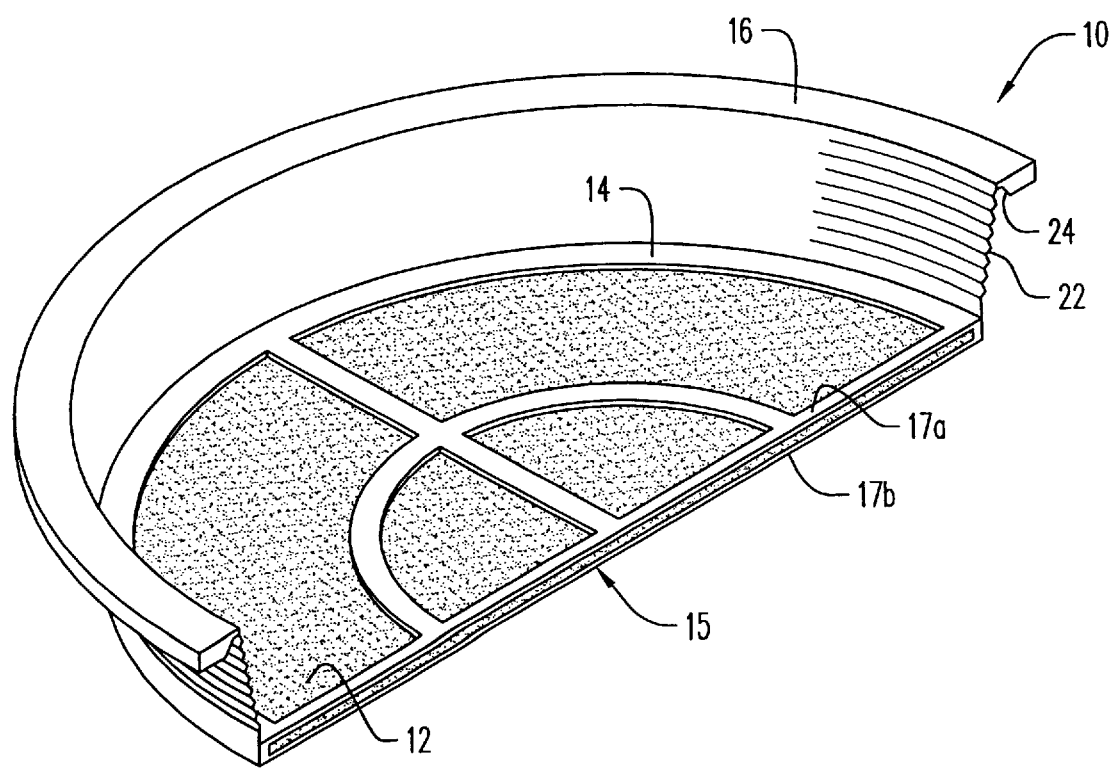
FIG. 2, which is an isometric cutaway view of the filter of the present invention shown in its expanded state.
Figure 4:
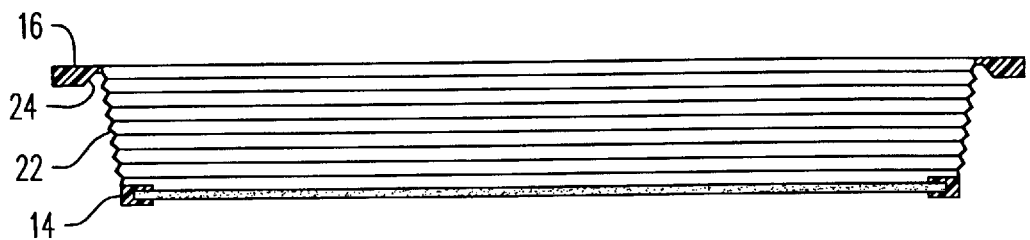
FIG. 4, which is cross-sectional view of the filter of the present invention taken along the line 4—4 in FIG. 3 illustrating the filter in its expanded state.
Figure 3:
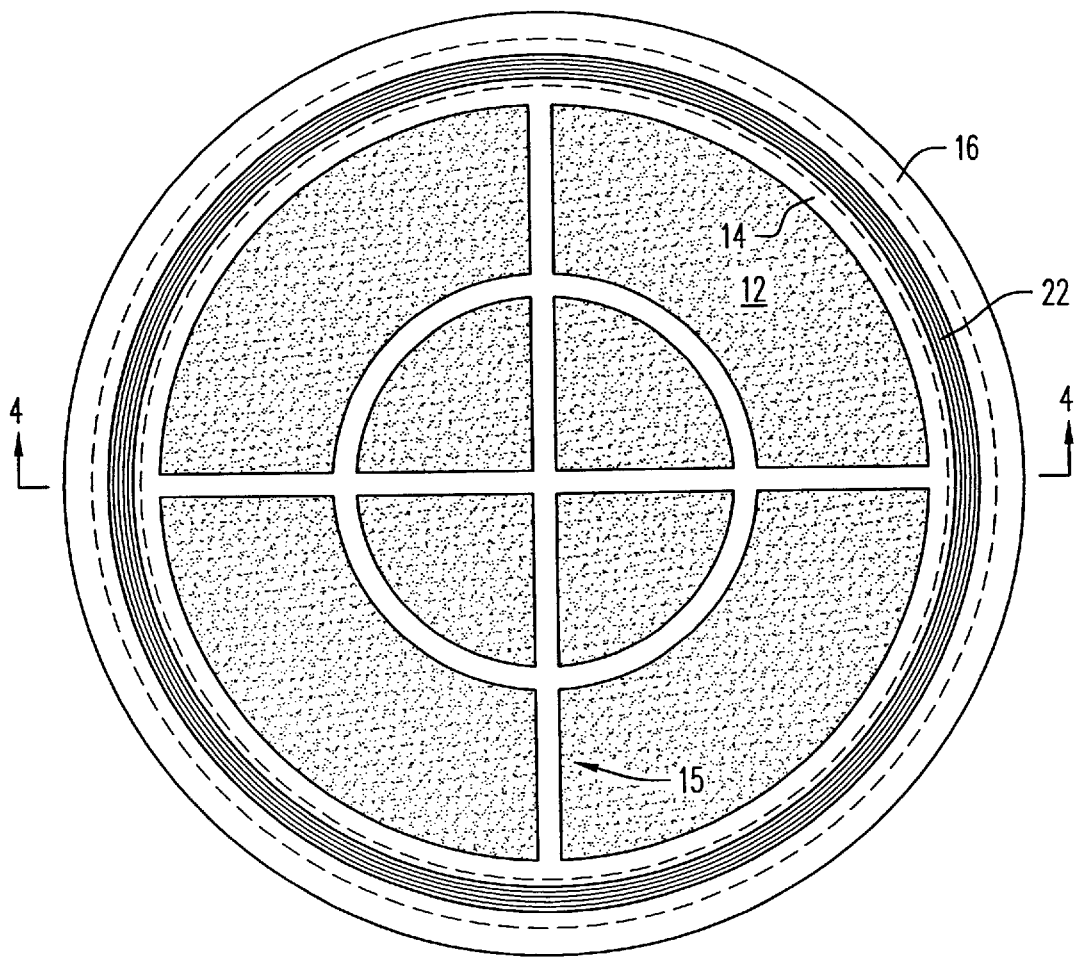
FIG. 3, which is a plan view of the filter of the present invention.

The present invention is directed to a filter that may be used with a beverage maker, typically a coffee maker, of the type having an open-top brew basket for containing a paper or metallic filter element. Referring to FIG. 1, the filter 10 has a filter medium 12 for filtering chemical impurities and particulate matter from water passing therethrough. A lower rim 14 is sealably disposed around the filter medium 12. If the filter is to be used in the brew basket of a coffee maker, the lower rim 14 is dimensioned so that it will fit inside thereof. The lower rim 14 defines an active filtration area.

The seal between the rim 14 and filter medium 12 can be provided by the use of a hot melt adhesive between the rim and the filter medium, by ultrasonic welding of the filter medium to the rim 14, by insert molding the rim 14 around the filter medium 12 or by a combination of the above-described techniques. Those skilled in the art will appreciate that if a hot melt adhesive is used to join the rim 14 and the filter medium 12 to form the seal or part thereof, and if the filter is to be used in a coffee maker, the adhesive must have a melting point high enough such that the adhesive will not melt when exposed to water at a temperature near its boiling point at atmospheric pressure.

A filter medium support frame 15 may be attached to the rim and disposed within the active filtration area defined by the rim 14 to support the filter medium 12. In a preferred embodiment, the frame is configured to have upper 17a and lower 17b portions and the filtration medium 12 is positioned therebetween in a sandwich fashion. However, those skilled in the art will appreciate that the filter assembly 10 may be provided with the equivalent of only the lower portion 17b of the frame 15 and that the filter medium 12 can be laid over the lower portion 17b of the frame 15 so that it is supported thereby.

Figure 6:
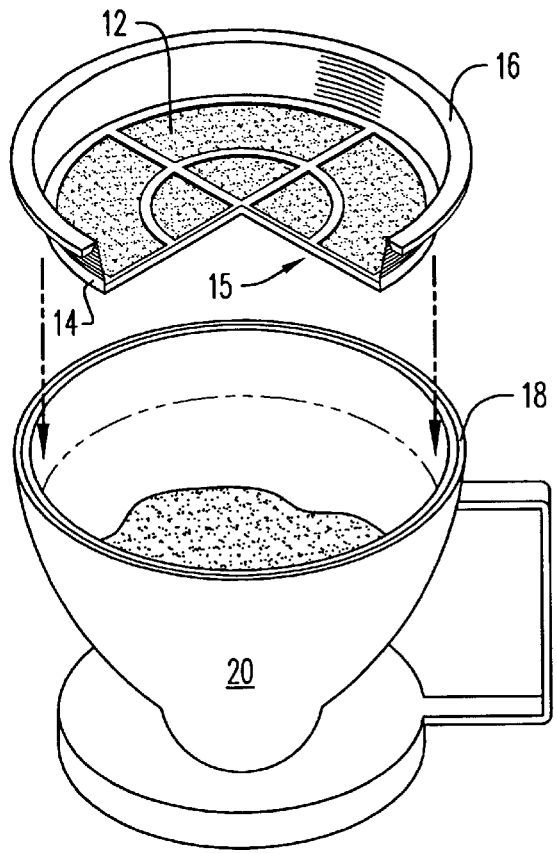
FIG. 6, which is an isometric cutaway view of the filter in its expanded state being positioned over the open top of a brew basket.
Figure 8:
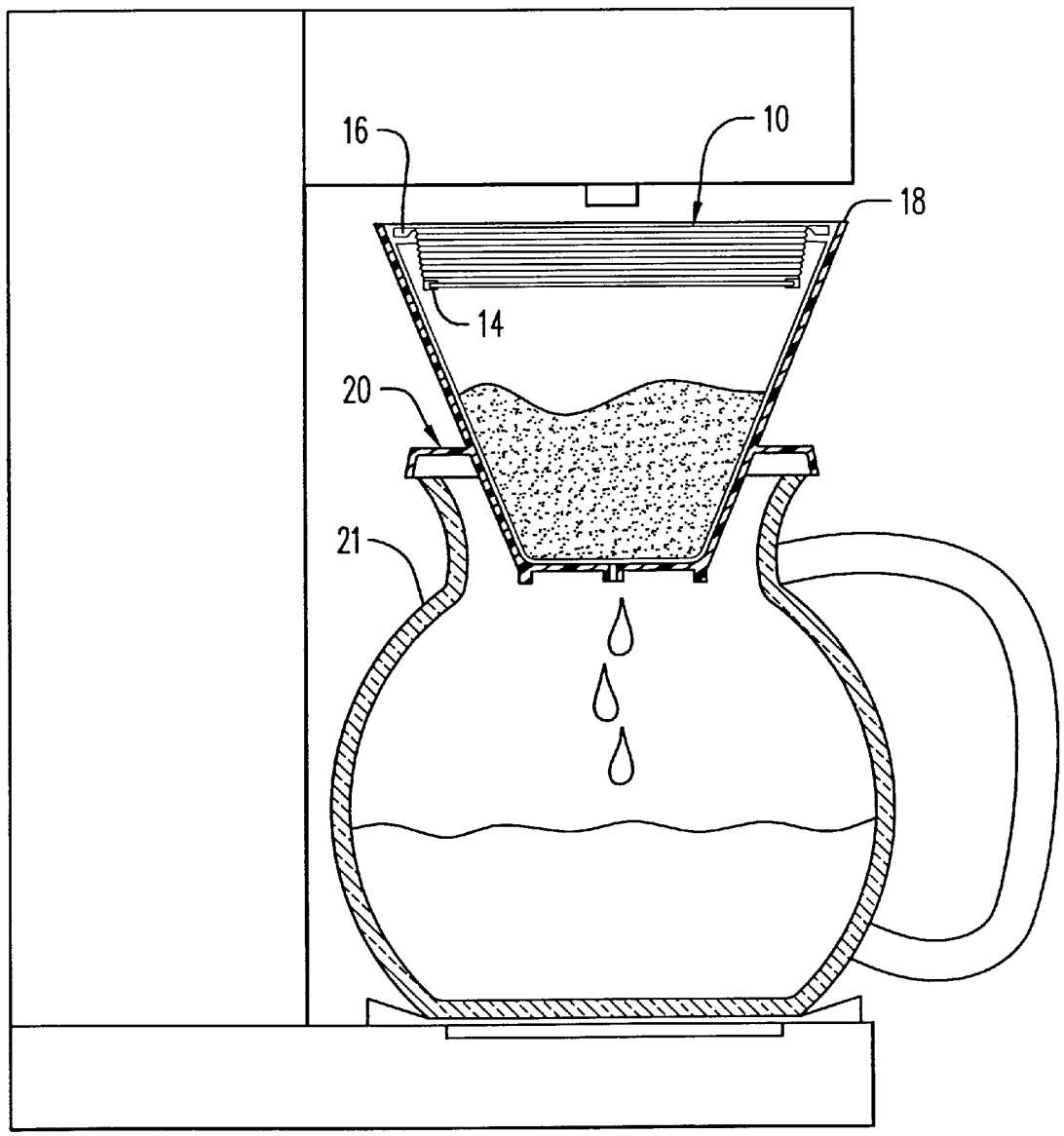
FIG. 8, which is a cross-sectional view of a drip type coffee maker having a pot residing on a heating element, a brew basket supported on the opening of the pot, and the filter of the present invention in its expanded state positioned in the brew basket.

Referring to the FIGS., the filter assembly 10 is further provided with an upper rim 16. The upper rim 16 may be made to have a larger diameter than the lower rim 14 for a filter intended to be used in brew baskets 20 (FIGS. 6 and 8) having a generally inverted frustaconical shape. The filter 10 may be disposed entirely within the brew basket 20 wherein both the upper and lower rims are supported in a spaced apart relationship by contact with the brew basket wall 21. Disposition entirely within the brew basket 20 is desirable for coffee makers having brew baskets that are slidingly engageable with the coffee maker. Alternatively, the filter need not be disposed entirely within the brew basket. For example, for brew baskets which sit on and are supported by a coffee pot 21, the upper rim 16 can be dimensioned to be larger than the diameter of the open-top rim 18 of the brew basket 20 (FIGS. 6 and 8). In this "larger than" configuration, an inwardly beveled surface 24 may be provided, and if provided, is dimensioned to engage with the open-top rim 18 of the brew basket. When the rim's beveled surface 24 is engaged with the open-top rim 18, general lateral and tilting movement of the filter assembly 10 is effectively prevented. Also, water cannot easily bypass the filter assembly 10.

Figure 5A:
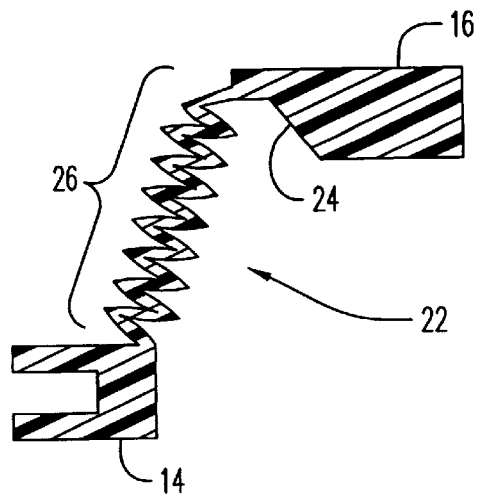
FIG. 5A, which is a partial cross-sectional view of the collapsible wall in the collapsed state.
Figure 5B:
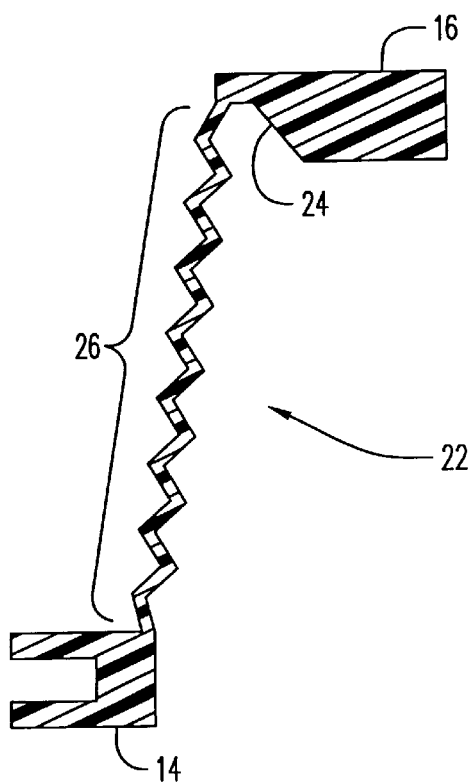
FIG. 5B, which is a partial cross-sectional view of the collapsible wall in the expanded state.

The filter assembly 10 also includes a fluid impervious collapsible wall 22 connected between the upper 16 and lower rims 14. The volume of space between the upper rim, collapsible wall, lower rim and filter medium define a liquid receiving container. Referring to FIGS. 1 through 5B, the collapsible wall 22 of the filter 10 can be collapsed between the upper 16 and lower 14 rims so as to minimize the volume occupied by the liquid receiving container and by the filter 10 generally when stored or when inserted in packaging. The collapsible wall 22 can be expanded between the upper 16 and lower 14 rims during use so as to maximize the volume occupied by the liquid receiving container and by the filter 10 generally. Referring to the partial cross-sectional views of FIGS. 5A and 5B, the collapsible wall 22 is formed by a plurality of interconnected pleated wall panels 26. FIG. 5A illustrates the pleated panels 26 in the collapsed state between the upper rim 16 and the lower rim 14. FIG. 5B illustrates the pleated panels 26 in the expanded state between the upper rim 16 and the lower rim 14.

The lower rim 14, the support frame 15, the upper rim 16 and the collapsible wall 22 can be made as a single piece of molded thermoplastic, if desired. The aforementioned features of the filter assembly 10 may be insert molded about the filter medium 12 in the configuration illustrated in the FIGS.

Any type of filter medium may be used with the present invention including particulate intercepting mediums and adsorbent mediums. For example, metallic mesh screens or spun bonded polymeric nonwoven materials may be used as particulate intercepting mediums. Such mediums may be used alone or in conjunction with adsorbents such as iodinated resin, activated carbon, activated alumina, alumina-silicates, ion-exchange resins, and manganese or iron oxides. As those skilled in the art will appreciate, the filter medium selected should provide suitable high flow filtration under a minimal pressure drop.

Figure 7A:
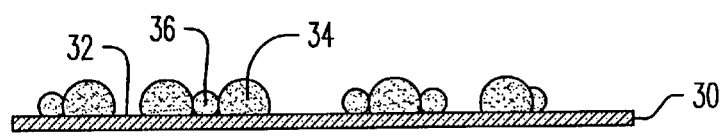
FIG. 7A, which is a cross-sectional view of a preferred embodiment filter media.
Figure 7B:
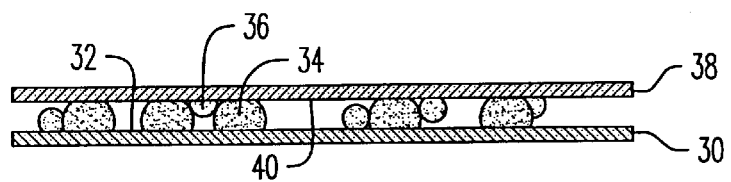
FIG. 7B, which is a cross-sectional view of an alternate preferred embodiment filter media.

Referring to FIGS. 7A and 7B, a high flow filter medium 12 may be formed by an adsorbent supporting web substrate 30 having a surface 32 coated with adsorbent particles 34 and binder particles 36 which are fused to the surface 32 and to the adsorbent particles 34. Preferably, the filter medium 12 described above and illustrated in FIG. 8 is arranged so that the surface containing the adsorbent particles 34 and binder particles 36 face the upper rim 16. The coating on the adsorbent supporting web substrate 30 can be obtained according to a method which is described in U.S. patent application Ser. No. 08/813,055, filed on Mar. 3, 1997 now U.S. Pat. No. 5,792,513, assigned to the assignee hereof, which is incorporated in its entirety herein by reference. As basically described in the co-pending application, the coating is obtained by preparing a mixture of adsorbent particles and binder particles. Preferably, the binder particles have an average particle size not exceeding approximately 80 microns. The mixture is applied to part or all of the surface 32 of the adsorbent supporting web substrate 30 to produce a loose powder coating on the front surface. The loose powder coating is heated to at least the Vicat softening temperature of the binder particle material but below the melting temperature of the adsorbent supporting substrate material and the adsorbent particle material to form softened binder particles 36. Pressure is applied to the web substrate 30 to cause the softened binder particles 36 to fuse with the adsorbent particles 34 and to the adsorbent supporting web substrate 30.

In the filtration medium illustrated in FIG. 7A, the adsorbent supporting web substrate 30 may be formed from non-woven fibrous materials such as the high strength spun bonded polyesters and polyolefins. Materials such as iodinated resin, activated carbon, activated alumina, alumina-silicates, ion-exchange resins, and manganese or iron oxides can be used as adsorbent particles 34. Materials forming the binder particles 18 typically include thermoplastics such polypropylene, linear low density polyethylene, low density polyethylene and ethylene-vinyl acetate copolymer.

Referring to the embodiment in FIG. 7B, the filter medium 30 can be modified to include an overlying web substrate 38 which has a surface 40 facing the coated surface 32 of the adsorbent supporting web substrate 30. The coating of binder particles 36 fused to the adsorbent particles 34 and to the surface 32 of the adsorbent supporting web substrate 30 may also be fused to the surface 40 of the overlying web substrate 38. The fusing of the binder particles 36 to the adsorbent supporting 30 and overlying 38 web substrates can be accomplished according to the disclosure in U.S. application Ser. No. 08/813,055 now U.S. Pat. No. 5,792,513. Essentially, after applying the mixture of adsorbent and binder particles to the surface of the adsorbent supporting web substrate 30 to produce a powder coating covering at least a portion thereof as described above, the overlying web substrate 38 is applied over the adsorbent supporting web substrate 30 and powder coating thereon. Pressure is applied to the adsorbent supporting 30 and overlying 38 web substrates to cause softened binder particles 36 to fuse with the adsorbent particles and both of the web substrates 12, 30 to form a sandwich configuration.

Either the adsorbent supporting web 30 or the overlying web 38, if used, can provide supplemental particulate filtration, which can be useful when the device is adapted to filter other fluids such as potable water. For example, the filter medium can serve to reduce certain waterborne oocysts when the filter medium is composed of a fine hydrophilic particulate filter medium, potentially combined with adsorbents such as activated carbon and heavy metal adsorbing zeolites. Copending U.S. patent application, filed Aug. 27, 1998, bearing Ser. No. 09/140,924 and assigned to the assignee hereof describes a low flow resistance composite filter medium for removing at least 99.95 percent of particulates of a size in the 3 to 4 micron range, such as oocysts, and dissolved chemical contaminants from a fluid that can be used as a high flow rate filter medium in the present invention. The subject matter of that application is incorporated herein by reference in its entirety.

As can be seen from the foregoing detailed description and drawings, the filter of the present invention provides a collapsible filter which can be fitted in the brew basket of coffee makers and which can be collapsed to reduce its size for more efficient storage. Those skilled in the art will realize that the filter of the present invention may be used with other fluid directing containers, such as funnels for example. Although the filtering apparatus has been described with respect to one or more particular embodiments, it will be understood that other embodiments of the present invention may be employed without departing from the spirit and scope of the present invention. Hence, the present invention is deemed limited only by the appended claims and the reasonable interpretation thereof.

What is claimed is:

1. A collapsible fluid filter comprising:

a filter medium for filtering impurities from a fluid, wherein said filter medium comprises an adsorbent selected from the group consisting of: iodinated resin, activated carbon, activated alumina, alumina-silicates, ion-exchange resins, metal oxides, and mixtures thereof;

a lower rim sealably disposed around the filter medium, the lower rim defining a filtration area;

an upper rim; and a fluid impervious collapsible wall connected between the upper and lower rims;

whereby a fluid containing reservoir is defined by the filter medium, the lower rim, the collapsible wall and the upper rim, whereby the collapsible wall of the filter can be collapsed between the upper and lower rims so as to minimize the volume occupied by the fluid containing reservoir and whereby the collapsible wall of the filter can be expanded between the upper and lower rims so as to maximize the volume occupied by the fluid containing reservoir during use.

2. The filter according to claim 1, wherein the lower rim includes a filter medium support frame disposed within the filtration area defined thereby, and wherein the filter medium is permitted to rest upon the frame so as to be supported thereby.

3. The filter according to claim 1, wherein the lower rim includes a filter medium support frame disposed within the filtration area defined thereby, wherein the filter medium support frame has an upper portion and a lower portion, and wherein the filter medium is positioned between the upper and lower portions of the support frame.

4. The filter according to claim 1, wherein the collapsible wall is formed by a plurality of interconnected pleated wall panels.

5. The filter according to claim 1, wherein the lower rim, the upper rim and the collapsible wall are made from a molded thermoplastic.

6. The filter according to claim 1, wherein the filter medium is a particulate intercepting medium formed from a metallic mesh screen.

7. The filter according to claim 1, wherein the filter medium is a particulate intercepting medium formed from a spun bonded polymeric nonwoven material.

8. The filter according to claim 1, wherein the area bounded by the upper rim is larger than the area bounded by the lower rim.

9. The filter according to claim 1, wherein the upper rim is provided with an inwardly beveled surface.

10. The filter according to claim 1, wherein said filter medium comprises an adsorbent substrate coated with a mixture of said adsorbent and binder particles, said binder particles being fused to said supporting substrate and said adsorbent.

11. The filter medium of claim 10, further comprising an overlying substrate, wherein said binder particles are fused to said overlying substrate.

12. The filter medium of claim 10, wherein said substrate is adapted to provide supplemental particulate filtration.

13. The filter medium of claim 10, wherein said binder particles are selected from the group consisting of polypropylene, linear low density polyethylene, low density polyethylene, and ethylene-vinyl acetate copolymer.

* * * * *